US007513665B2

(12) United States Patent
Chinniah et al.

(10) Patent No.: US 7,513,665 B2
(45) Date of Patent: Apr. 7, 2009

(54) HEADLAMP MODULE AND HEADLAMP ASSEMBLY WITH INTERNALLY REFLECTING TRANSLUCENT MEMBER

(75) Inventors: Jeyachandrabose Chinniah, Canton, MI (US); Edwin M. Sayers, Saline, MI (US); Christopher L. Eichelberger, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/435,249

(22) Filed: May 16, 2006

(65) Prior Publication Data

US 2007/0268713 A1 Nov. 22, 2007

(51) Int. Cl.
*B60Q 3/00* (2006.01)

(52) U.S. Cl. ........................ 362/507; 362/308; 362/328

(58) Field of Classification Search ................. 362/245, 362/308, 328, 507, 522, 545, 548
See application file for complete search history.

(56) References Cited

U.S. PATENT DOCUMENTS

| | | | | |
|---|---|---|---|---|
| 4,698,730 | A | 10/1987 | Sakai et al. | |
| 5,707,130 | A | 1/1998 | Zwick et al. | |
| 5,857,770 | A | 1/1999 | Fohl et al. | |
| 5,890,796 | A | 4/1999 | Marinelli et al. | |
| 5,924,788 | A | 7/1999 | Parkyn, Jr. | |
| 6,527,411 | B1 | 3/2003 | Sayers | |
| 6,639,360 | B2 | 10/2003 | Roberts et al. | |
| 6,803,607 | B1 | 10/2004 | Chan et al. | |
| 6,850,095 | B2 | 2/2005 | Sayers et al. | |
| 6,891,333 | B2 | 5/2005 | Tatsukawa et al. | |
| 6,896,381 | B2 | 5/2005 | Benitez et al. | |
| 6,948,838 | B2 | 9/2005 | Kunstler | |
| 7,097,334 | B2 * | 8/2006 | Ishida et al. | 362/516 |
| 7,270,454 | B2 * | 9/2007 | Amano | 362/522 |
| 2001/0019488 | A1 | 9/2001 | Hulse et al. | |
| 2002/0085384 | A1 | 7/2002 | Tiesler-Wittig | |
| 2003/0235046 | A1 | 12/2003 | Chinniah et al. | |
| 2004/0125610 | A1 | 7/2004 | Lekson et al. | |
| 2004/0125614 | A1 | 7/2004 | Ishida et al. | |
| 2005/0088758 | A1 | 4/2005 | Minano et al. | |
| 2005/0152153 | A1 | 7/2005 | Amano | |
| 2005/0180158 | A1 | 8/2005 | Komatsu | |
| 2005/0231983 | A1 | 10/2005 | Dahm | |

FOREIGN PATENT DOCUMENTS

| | | | |
|---|---|---|---|
| EP | 1 357 333 | A2 | 10/2003 |
| EP | 1 418 381 | A2 | 5/2004 |

* cited by examiner

*Primary Examiner*—John A Ward
(74) *Attorney, Agent, or Firm*—Brinks Hofer Gilson & Lione

(57) ABSTRACT

A headlamp module for a motor vehicle. The module includes a light source and a translucent member for internally reflecting the light rays so as to be directed. In one aspect of the invention, the light source is discretely positioned adjacent to a periphery defined by the exit surface so as to be directly hidden from view from the front of the vehicle. In another aspect, an outer surface of the light source is directly supported by the translucent member so that light rays emitted through an outer surface of the light source directly enter the translucent member.

24 Claims, 8 Drawing Sheets

HEADLAMP MODULE AND HEADLAMP ASSEMBLY WITH INTERNALLY REFLECTING TRANSLUCENT MEMBER

BACKGROUND

1. Field of the Invention

The invention relates generally to a headlamp assembly and a headlamp module for use in a motor vehicle. More specifically, the invention relates to a headlamp module having an internally-reflecting trough for directing light rays in a forward direction and a headlamp assembly having a plurality of headlamp modules, at least one of which includes an internally-reflecting trough for directing light rays in a forward direction.

2. Related Technology

Conventional headlamp assemblies typically include one or more sets of headlamp modules cooperating with each other to provide illumination for a motor vehicle. For example, one set of headlamp modules may define a low beam, another set of headlamp modules may define a high beam, and another set of headlamp modules may define a turn signal.

Each of the headlamp modules typically includes a housing and a lens cooperating to define a cavity, a light element that is generally centrally located within the cavity, and a reflector positioned near a rear portion of the cavity to reflect light rays from the light element towards the front of the cavity and out through the lens. Often, the light element is a light emitting diode connected to the headlamp module by a support arm. Furthermore, the reflector is typically a component made of a generally reflective material, such as polished metal or highly-reflective plastic that covers all or most of the rear wall of the cavity.

Because the light element is positioned in a generally closed cavity, the housing and the components defining and providing electricity to the light element are potentially exposed to undesirable heat levels from light element. Therefore, this type of design typically requires temperature mitigating components, such as a heatsink supporting the light element with respect to the housing and cooling channels formed by the housing itself. Even if these structures are able to consistently prevent undesirably high heat levels, the temperature mitigating components generally increase the complexity and the part cost of this type of headlamp module.

Due to their highly reflective nature and centralized location, the light element, the components supporting the light element, and the reflector are all highly visible components. More specifically, these components are particularly visible when the light element is not emitting light, causing the unlit headlamp module to have a generally undesirable aesthetic appearance.

Another known type of headlamp module is an internal reflector module. In this design, a light source is spaced apart from the base of a translucent block for directing light rays into the body of the translucent block. More specifically, the light source is positioned along a central axis of the translucent block so that the light rays exit the light source, travel across an air gap, and then enter the translucent block. The light rays are then reflected internally by the inner surfaces of the translucent block in a desired direction. However, as with the above described design, the centralized location of the light source creates a generally aesthetically undesirable appearance. Furthermore, the air gap may cause undesirable light loss or an unsecured connection between the light source and the translucent block.

It is therefore desirous to provide a headlamp module having a decreased complexity and part cost and an aesthetically desirable appearance.

SUMMARY

In overcoming the limitations and drawbacks of the prior art, a headlamp module is provided, including a light source for emitting light rays and a translucent member for supporting the light source and directing the light rays in a forward direction. More specifically, the light element is positioned so that the light rays enter the translucent member and are internally reflected in a forward direction by a reflection surface. The light rays then pass through an exit surface of the translucent member as a light beam.

In one aspect of the present invention, the support portion is positioned with respect to the exit surface such that a projection of the support portion along a line parallel to the light ray axis is located adjacent to or outside of a periphery of the exit surface. Therefore, the light source is discretely positioned with respect to the exit surface so as to be substantially hidden to an observer examining the unlit headlamp module from the front of the vehicle.

In another aspect of the present invention, the translucent member includes top and bottom surfaces that each intersect respective portions of the exit surface and the support portion is defined by the top surface. More specifically, the top surface extends generally perpendicularly from a top portion of the exit surface and defines a relief for supporting the light element.

In another aspect, the bottom surface extends in a direction that is not perpendicular with the exit surface so that the light rays are focused into a beam exiting the exit surface. More specifically, the bottom surface generally defines a parabola and the light source is positioned adjacent to a focus thereof so that the light rays are vertically focused into a beam.

The headlamp module also includes first and second side surfaces that intersect: the top surface, the bottom surface, and the exit surface. The side surfaces each preferably include a tapered portion extending in a direction not parallel to the light ray axis so that the light rays are horizontally focused into a beam exiting the exit surface. The tapered portion may be generally linear or arcuate.

In another aspect of the present invention, the translucent member includes a reflective coating defining at least a portion of the reflection surface to prevent light rays from exiting the translucent member through surfaces other than the exit surface.

In yet another aspect, the headlamp module includes a plurality of light sources supported by a second support portion of the translucent member.

In another aspect of the present invention, the light source emits light rays through an outer surface and at least a portion of the outer surface is engaged by a support portion of the translucent member so that light rays emitted through the outer surface of the light source are able to immediately enter the translucent member. This configuration reduces light losses that may occur when the light rays from traveling through different mediums.

In one design, the light source is a light emitting diode and the outer surface is at least partially defined by a translucent protective coating. Additionally, the support portion preferably completely engages the outer surface of the translucent protective coating. Furthermore, the translucent protective coating is preferably connected to the support portion by a form-fitting engagement.

In another aspect of the present invention, a headlamp assembly for a motor vehicle includes a plurality of headlamp modules cooperating to provide illumination for the motor vehicle. In one design, at least one of the plurality of headlamp modules is a trough module cooperating with at least one other trough module to define a set of trough modules. The headlamp assembly may also include a set of projector modules cooperating with the set of trough modules to generate a low beam. The headlamp assembly may also include a high beam module configured to generate a high beam and a turn signal module configured to generate a light signal beam.

Further objects, features and advantages of this invention will become readily apparent to persons skilled in the art after a review of the following description, with reference to the drawings and claims that are appended to and form a part of this specification.

DETAILED DESCRIPTION

Figure 1:
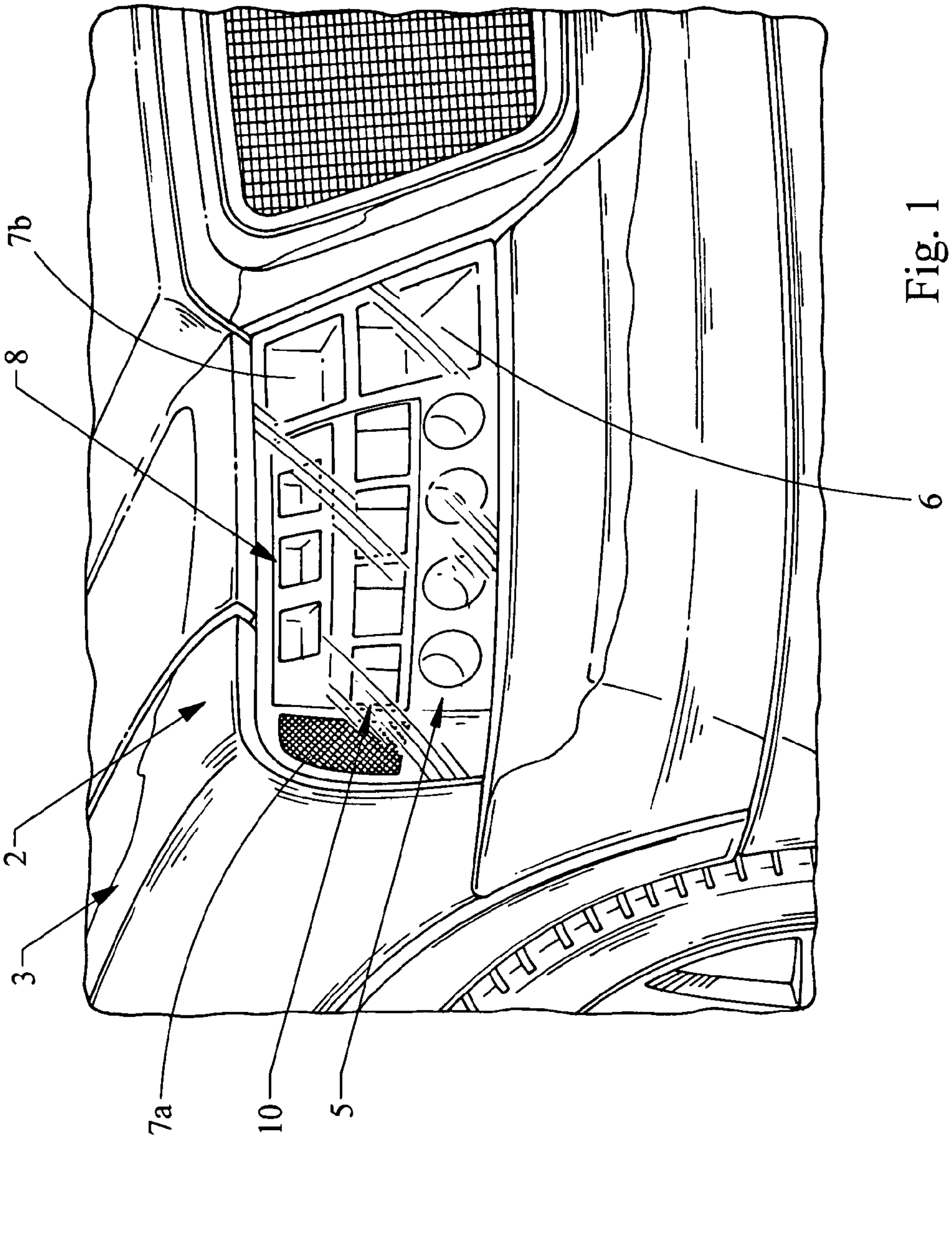
FIG. 1 is an isometric view of a headlamp assembly connected to a motor vehicle and embodying the principles of the present invention, wherein the headlamp assembly includes a set of trough-type headlamp modules and a set of projector-type headlamp modules.

Referring now to the drawings, FIG. 1 shows a headlamp assembly 2 installed in the front of a motor vehicle 3, including a set of trough-type headlamp modules 10 and a set of projector-type headlamp modules 5 cooperating to generate a low beam; a high beam module 6 for generating a high beam; a set of turn signal modules 7*a*, 7*b* for generating a turn signal beam; and a set of park light modules 8 for generating a parking light beam. The projector-type headlamp modules 5, the high beam module 6, the turn signal modules 7*a*, 7*b*, and the park light modules 8 shown in FIG. 1 are each generally known in the prior art.

Figure 2:
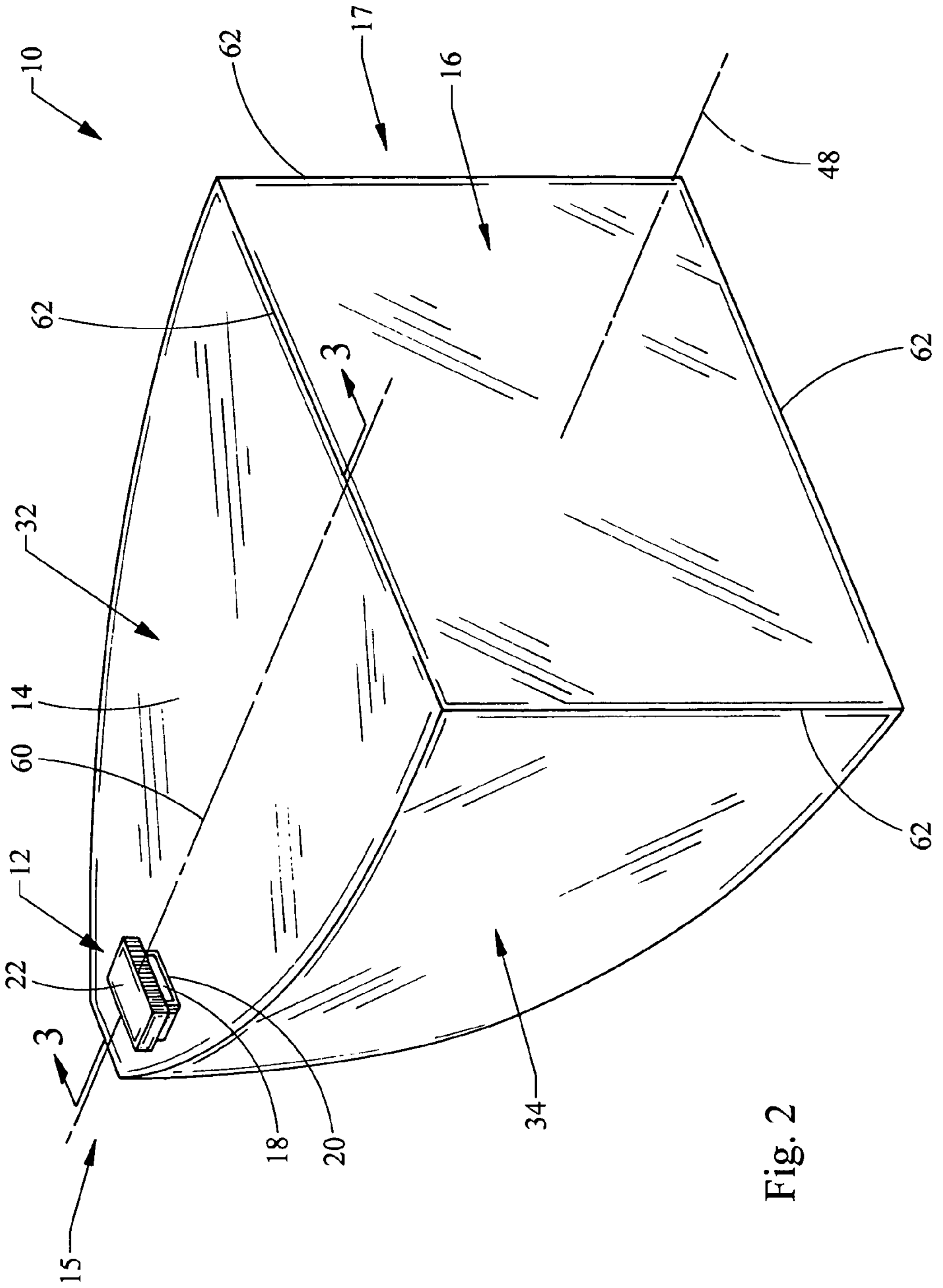
FIG. 2 is an isometric view of a trough-type headlamp module shown in FIG. 1 having a light source and a translucent member and embodying the principles of the present invention.

FIG. 2 shows an enlarged view of the trough-type headlamp module 10 shown in FIG. 1. The trough-type headlamp module 10 includes a light source, such as a light emitting diode (LED) 12, and a translucent member, such as a trough 14, for directing light rays from the LED 12 in a forward direction. More specifically, the LED 12 is positioned near a rear portion 15 of the trough 14 so that light rays enter the trough 14 and are directed forwards through an exit surface 16 at a front portion 17 of the trough 14 to define a light beam for illuminating an area in front of the motor vehicle.

Figure 3:
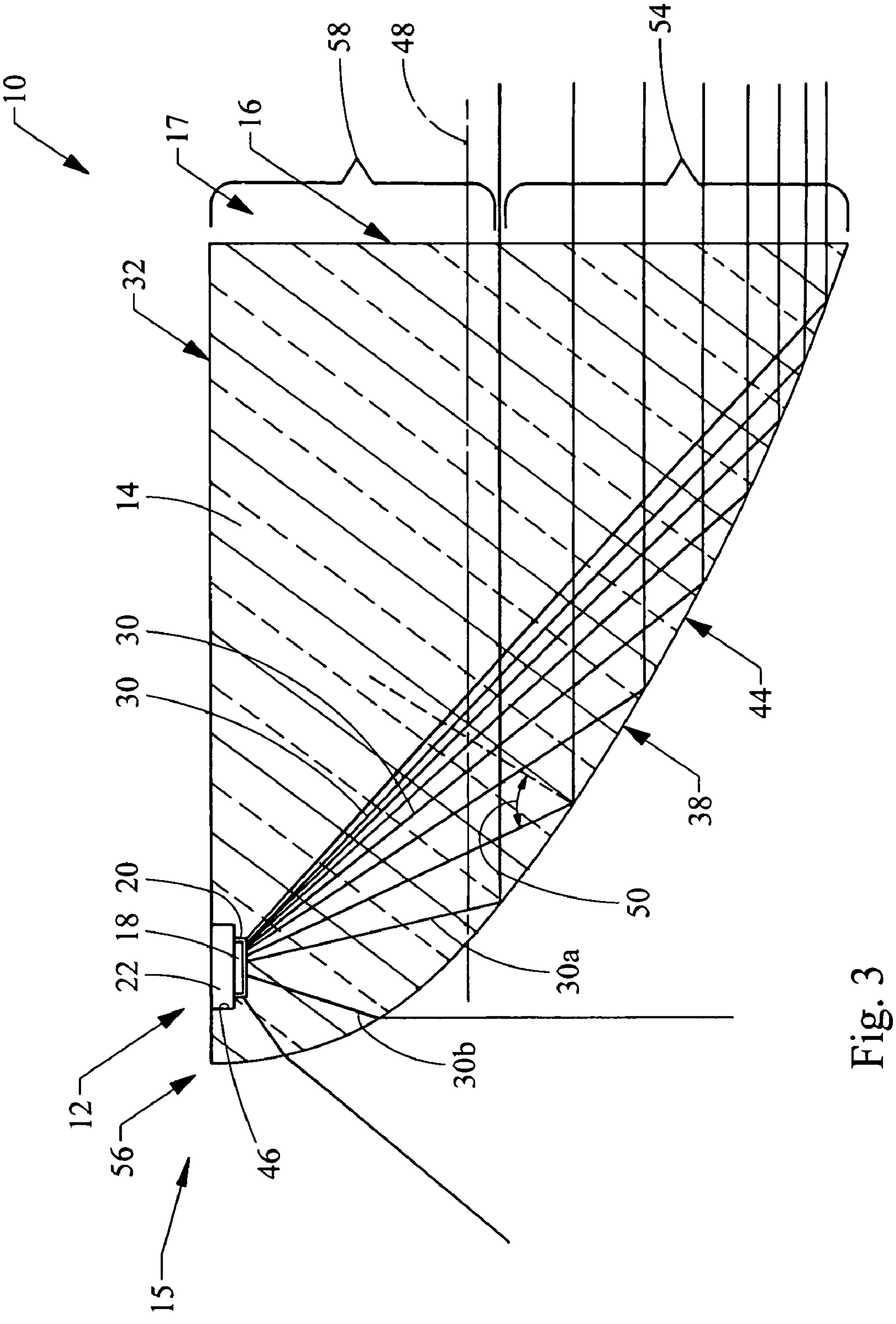
FIG. 3 is a cross-sectional view of the trough-type headlamp module taken along line 2-2 in FIG. 2.

As shown in FIG. 3, the LED 12 includes a chip 18 for emitting light, a translucent protective coating 20 surrounding the chip 18 for protection thereof, and a substrate 22 supporting the chip 18 within the trough 14 and housing electrical components of the LED 12. As is known in the art, to illuminate the LED 12 an electrical current is passed to the chip 18 via electrical wiring (not shown) and the movement of electrons across a pair of diodes (not shown) causes the LED 12 to emit light rays 30. Alternatively, any other appropriate light source may be used with the trough-type headlamp module 10, including but not limited to incandescent light bulbs or high intensity discharge lamp.

The trough 14 shown in the figures is a single, unitary solid body component defining a top surface 32, a pair of side surfaces 34, 36, and a bottom surface 38 that each intersect the exit surface 16 along edges thereof. More specifically, the top surface 32 and the exit surface 16 are both generally planar surfaces positioned generally perpendicular to each other (see FIG. 3). Furthermore, the side surfaces 34, 36 and the bottom surface 38 each define generally arcuate surfaces for directing the light rays as desired, as will be discussed in further detail below. The side surfaces 34, 36 are generally perpendicular to the exit surface 16 at the point of intersection, but taper inwardly along respective parabolic paths 40, 42 from the front portion 17 to the back portion 15 of the trough 14 (see FIG. 5). Similarly, the bottom surface 38 defines a parabolic path 44 tapered upwardly from the front portion 17 to the back portion 15 of the trough 14 (see FIG. 3). As will be discussed in more detail below, the parabolic paths 40, 42, 44 of the side and bottom surfaces 34, 36, 38 cause light rays to be directed light towards the center of the beam pattern that exits through the exit surface 16.

Figure 4:
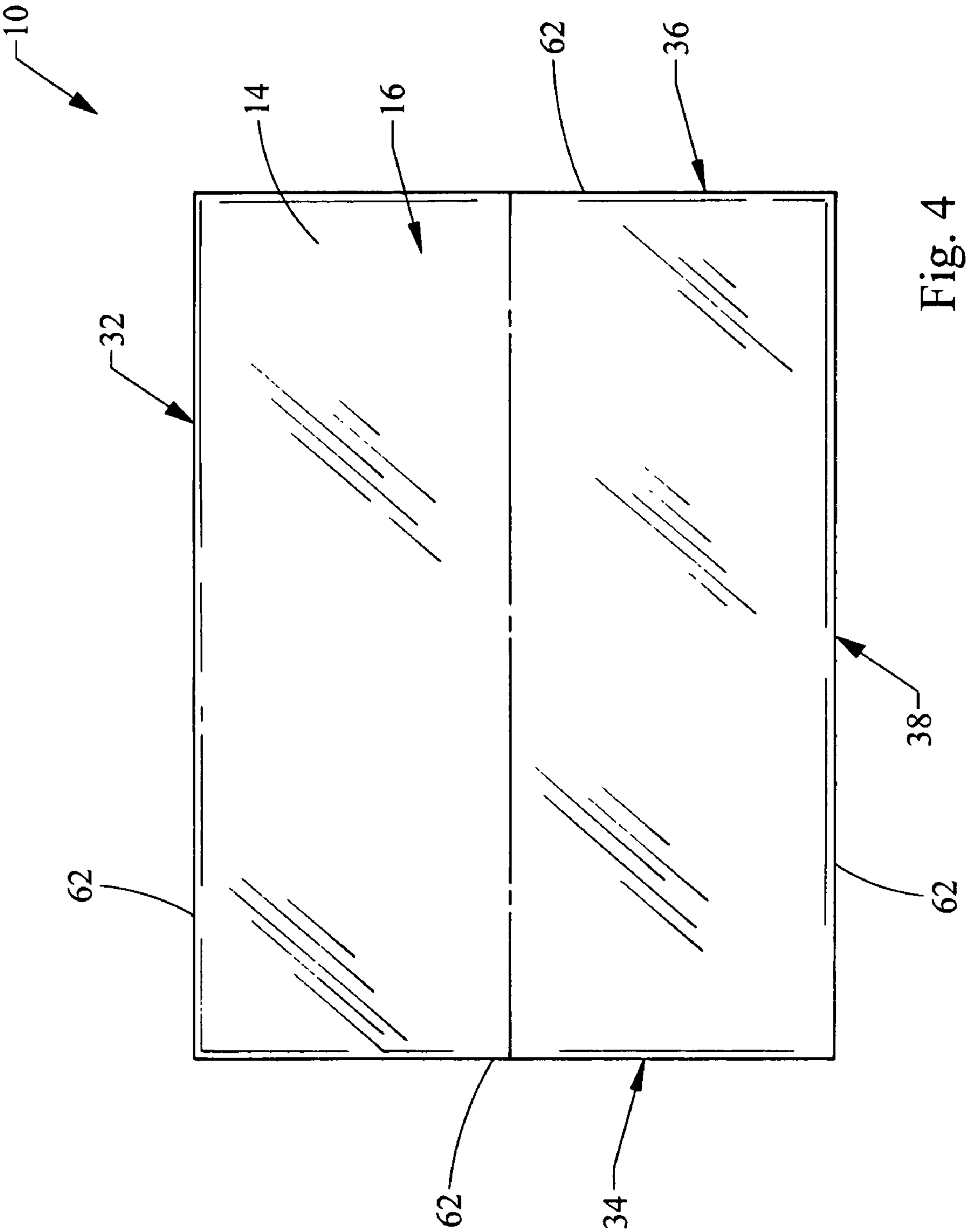
FIG. 4 is a front view of the trough-type headlamp module shown in FIG. 2.

The LED 12 is supported by a support portion 46 of the trough 14 positioned with respect to the exit surface 16 such that a projection of the support portion 46 along a line 60 parallel to the light ray axis 48, is located adjacent to or outside of a periphery 62 of the exit surface 16, thereby substantially hiding the LED 12 to an observer examining the unlit trough-type headlamp module 10 from the front of the vehicle. This configuration is illustrated in FIGS. 2 and 4, where the support portion 46 is positioned in-line with the periphery 62 of the exit surface 16.

The support portion 46 in the figures is a recess formed in the top surface 32 of the trough 14 so that the light rays entering the trough 14 are directed towards the bottom surface 38 (as best shown in FIG. 3). More specifically, the support portion 46 is located in the rear portion 15 of the trough 14, adjacent to a focus 56 of the parabolic paths 40, 42, 44 of the side and bottom surfaces 34, 36, 38.

The above-described positioning of the LED 12 with respect to the trough 14 offers many advantages that are discussed in more detail below. First of all, the positioning of the LED 12 adjacent to the focus 56 of the parabolic paths 40, 42, 44 causes the light rays that exit the LED to be focused into a beam that exits the exit surface 16. Secondly, as mentioned above, the positioning of the LED 12 along the top surface 32 of the trough improves the aesthetic appearance by minimizing the perception of the LED 12, of the trough-type headlamp module 10 for an observer viewing the module 10 from the front of the vehicle. Thirdly, the orientation of the LED 12 shining light rays in the downward direction minimizes glare to occupants of on-coming vehicles.

The support portion 46 shown in the figures conforms to the shape of the LED 12 to minimize or eliminate any air gaps between the LED outer surface and the trough 14. The form-fitting configuration between the outer surface of the LED 12 and the trough 14 securely connects the components 12, 14 to each other and reduces the likelihood of undesirable separation thereof. Furthermore, the form-fitting configuration reduces or prevents relative movement between the components 12, 14, thereby reducing premature part wear. The LED 12 may be coupled with the trough 14 by a form-fitting engagement or by another appropriate connection means, such as an adhesive or a mechanical fastener. However, direct contact between the LED chip 18 and the trough 14 may cause damage or premature wear to the LED 12. Therefore, the translucent protective coating 20 surrounds the chip 18 to provide protection and to increase the product life of the LED 12.

The elimination of air gaps between the LED outer surface and the trough 14 may also reduce light losses within the trough-type headlamp module 10. It is a natural principle that light traveling between different mediums may undergo light losses due to reflection. Thus, it is generally desirable to minimize the number of different mediums that the light rays must travel through before exiting the trough-type headlamp module 10. It is therefore more specifically desirable to minimize air gaps that the light rays must travel through.

As mentioned above, the light rays 30 entering the trough 14 are directed towards the bottom surface 38 and substantially internally reflected in a forward direction towards the exit surface 16. More specifically, some of the light rays (the reflected rays 30*a*) are reflected towards the exit surface 16 while the remaining light rays (the refracted rays 30*b*) may exit the trough 14 through the bottom surface 38.

As is a generally known natural principle, when a light ray intersects a boundary of a medium at a relatively large angle of incidence, a substantial percentage of the light ray will be reflected within the medium and the small, remaining percentage of the light ray will be refracted while exiting the medium through the boundary. Conversely, when a light ray intersects a boundary of a medium at a relatively small angle of incidence, a substantial percentage of the light ray will be refracted while exiting the medium through the boundary and the small, remaining percentage of the light ray will be reflected within the medium. Therefore, resultant light rays typically include both reflected components and refracted components. However, for illustrative purposes, resultant light rays are referenced by and depicted with their dominant components. As used herein, the term "reflected rays 30*a*" refers to rays each have a higher percentage of light that is reflected towards the exit surface 16 than light that is refracted through the bottom surface 38 of the trough 14. Similarly, as used herein, the term "refracted rays 30*b*" refers to rays each have a higher percentage of light that is refracted as it exits the bottom surface 38 than light that is reflected towards the exit surface 16.

The above principle is demonstrated with respect to the present invention in FIG. 3, where the reflected rays 30*a* each strike the bottom surface 38 at a relatively large angle of incidence 50 and the refracted rays 30*b* each strike the bottom surface 38 at a relatively small angle of incidence 50. The reflected rays 30*a* are each substantially completely reflected towards the exit surface 16 whereas the refracted rays 30*b* are each permitted to substantially completely exit the trough 14 through the bottom surface 38. As a result of exiting through the bottom surface 38, the refracted rays 30*b* are not utilized for illuminating the area in front of the vehicle. Therefore, it is desirable to maximize the reflected rays 30*a* and minimize the refracted rays 30*b,* as will be discussed in more detail below with respect to further embodiments of the present invention.

As mentioned above, the bottom surface 38 of the trough 14 defines a parabolic path 44. More specifically, the parabolic path 44 is configured such that the reflected rays 30*a* are generally evenly spread in a vertical direction when shining through the exit surface 16. The positioning of the LED 12 adjacent to the focus 56 of the parabolic path 44 of the bottom surface 38 further improves the concentration of the reflected rays 30*a* in the vertical direction.

However, due to the light losses from the refracted rays 30*b,* the light rays 30 only exit a lower portion 54 of the exit surface 16, thereby only illuminating a lower portion of the trough-type headlamp module 10. As used herein, the illuminated portion 54 is defined as the portion of the exit surface 16 that receives a substantial amount of light rays when the LED is illuminated. Similarly, a non-illuminated portion 58 is defined as the portion of the exit surface 16 that receives little or no light when the LED is illuminated. Although the non-illuminated portion 58 may receive trace amounts of light that are remnants of the refracted rays 30*b,* this light is not necessarily sufficient enough to effectively illuminate an area in front of the trough-type headlamp module 10.

The parabolic path 44 is also configured such that the rays 30*a* reflected by the bottom surface 38 are directed so as to be parallel with each other and to define a light beam extending generally along a light ray axis 48. Although some of the reflected rays 30*a* may extend in a direction not parallel to the axis 48, the headlamp beam is substantially focused to extend along the axis 48.

Figure 5:
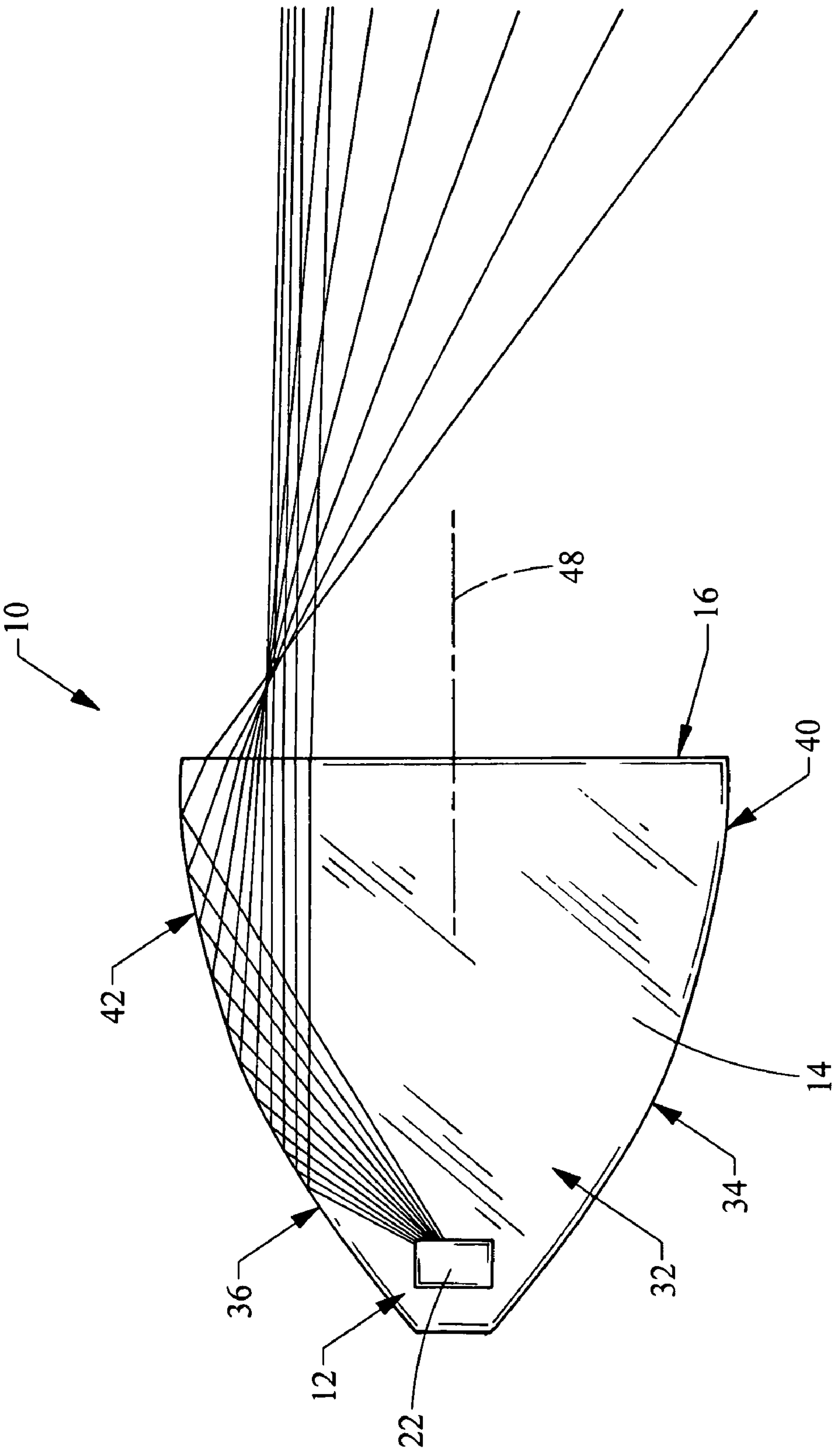
FIG. 5 is a top view of the trough-type headlamp module shown in FIG. 2.

As mentioned above, the side surfaces 34, 36 of the trough 14 also define parabolic paths 40, 42. More specifically, the parabolic paths 40, 42 are configured such that the reflected rays 30*a* are generally evenly spread in a horizontal direction when shining or passing through the exit surface 16 (as best shown in FIG. 5). The positioning of the LED 12 adjacent to the focus 56 of the parabolic paths 40, 42 further improves the concentration of the reflected rays 30*a* in the horizontal direction.

However and as shown in FIG. 5, the parabolic paths 40, 42 are configured such that only some of the reflected rays 30*a* that are reflected by the side surfaces 34, 36 are directed so as to be parallel with each other and to define the headlamp beam extending along a light ray axis 48. The remaining reflected rays 30*a* are directed along paths not parallel with the light ray axis 48 so as to be dispersed across lateral areas in front of the vehicle. More specifically, while it is generally desirable for the headlamp beam to have a relatively focused spread in the vertical direction, it is generally desirable for the headlamp beam to have a wider range of lateral illumination so that the vehicle occupants are able to see a wider area in front of the vehicle. Comparing the parabolic paths 40, 42, 44 in FIGS. 3 and %, the path 44 of the bottom surface 38 maintains a generally downward slope near the front portion 17 of the trough 14, whereas the side surfaces 34, 36 have paths 40, 42 that are generally parallel with the beam axis 48 near the front portion 17 of the trough 14.

The respective paths 40, 42, 44 of the trough 14 can be altered from those shown in FIGS. 2-5 to produce a headlamp beam having particular characteristics. For example, the side paths may have different slopes and/or different shapes so that the trough-type headlamp module has a wider range of illumination on one side compared to the other side. This design may be particularly advantageous for the different characteristics desired from a driver-side trough-type headlamp module and a passenger-side trough-type headlamp module. For example, it may be desirable for the drivers-side trough-type headlamp module to have a wider range of illumination to the left and a trough-type passenger-side trough-type headlamp module to have a wider range of illumination to the right.

Furthermore, as discussed above, the location of the LED 12 along the top surface 32 of the trough 14 also improves the aesthetic appearance of the trough-type headlamp module 10 to an observer viewing the trough-type module 10 from the front of the vehicle. Because the LED 12 is positioned generally adjacent or in-line with the periphery 62 of the exit surface 16 rather than centrally with respect to of the exit surface 16, an observer is less likely to see and notice the LED 12 through the exit surface 16. Furthermore, because the upper portion of the exit surface 16 is the non-illuminated portion 58, an opaque trim portion may be disposed over the non-illuminated portion 58 to further conceal the LED 12.

The downward-facing orientation of the LED 12 generally minimizes glare from distracting the vehicle occupants. For example, the refracted rays 30*b* exit the trough 14 in the downward direction.

The trough 14 is preferably formed of a generally transparent material having a relatively high luminous transmittance to minimize light losses within the trough. For example, the trough 14 is preferably made from one of the following materials: glass, polymethyl methacrylate (PMMA), polycarbonate resins, polystyrene resins, styrene-acrylonitrile (SAN) resins, cellulose acetate, or any other material having a relatively high light transmission percentage.

It may also be desirable for the trough 14 to be formed of an easily moldable material, such as resin, to simplify the manufacturing process and reduce manufacturing costs. Although it may be desirable for the resin to have a particular color so that the light beam is colored, the resin is preferably colorless or lightly tinted so as to further minimize light losses. Alternatively, the trough 14 may be substantially colorless with a tinted portion defining the exit surface 16. In this design, it may be advantageous to form the trough of two, differently-colored sections that are connected with each other.

Figure 6:
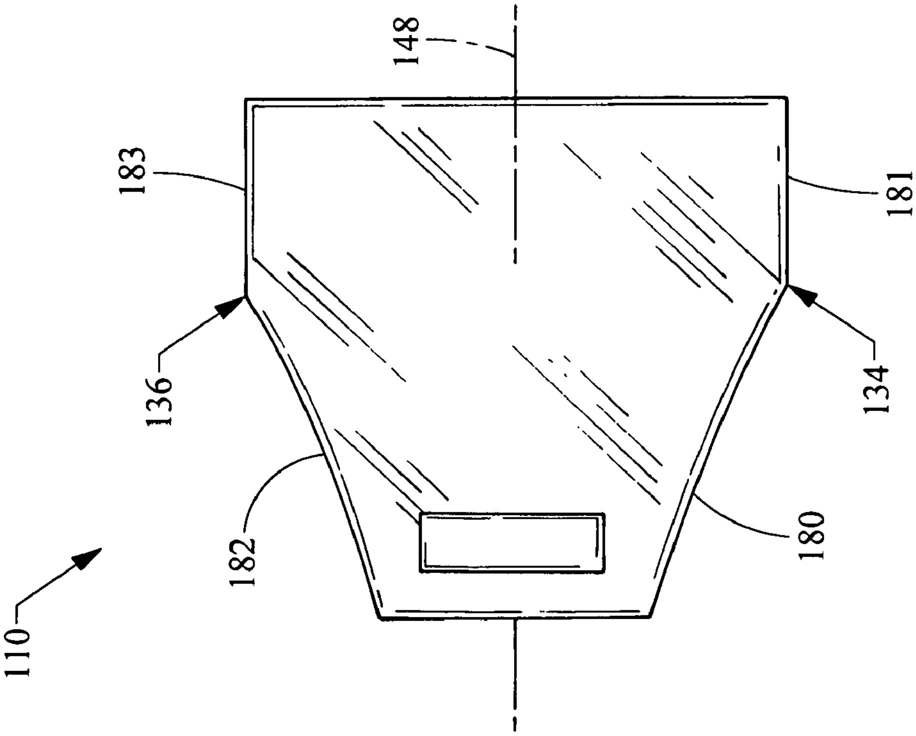
FIG. 6 is a top view of an alternative embodiment of a trough-type headlamp module having tapered side walls and embodying the principles of the present invention.

Referring to FIG. 6, an alternative trough-type headlamp module 110 is shown, having side surfaces 134, 136 that each define a tapered portion 180, 182 extending in a direction not parallel to the light ray axis 148 and a non-tapered portion 181, 183 extending in a direction substantially parallel to the light ray axis 148. The non-tapered portions 181, 183 provide converging light rays similar to the design shown in FIG. 5, but the portions 180, 181, 182, 183 are generally linear to simplify the manufacturing steps and to simplify the mounting components for the trough-type headlamp module 110.

Figure 7:
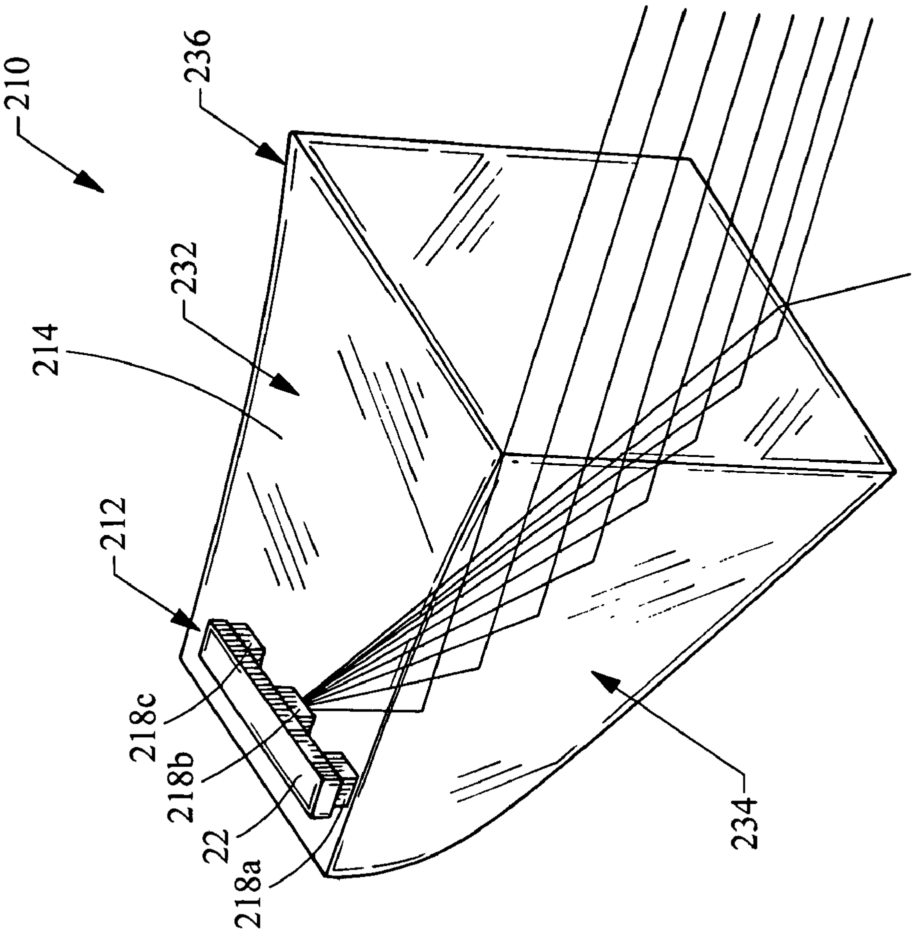
FIG. 7 is an isometric view of another alternative embodiment of a trough-type headlamp module having multiple light elements and embodying the principles of the present invention.

FIG. 7 shows another alternative trough-type headlamp module 210, including a plurality of LED's 218*a*, 218*b*, 218*c* (three being illustrated) supported by the translucent member 214. Due to the presence of multiple LED's 218*a*, 218*b*, 218*c*, the trough-type headlamp module 210 can produce a headlamp beam generally having a higher light output.

Figure 8:
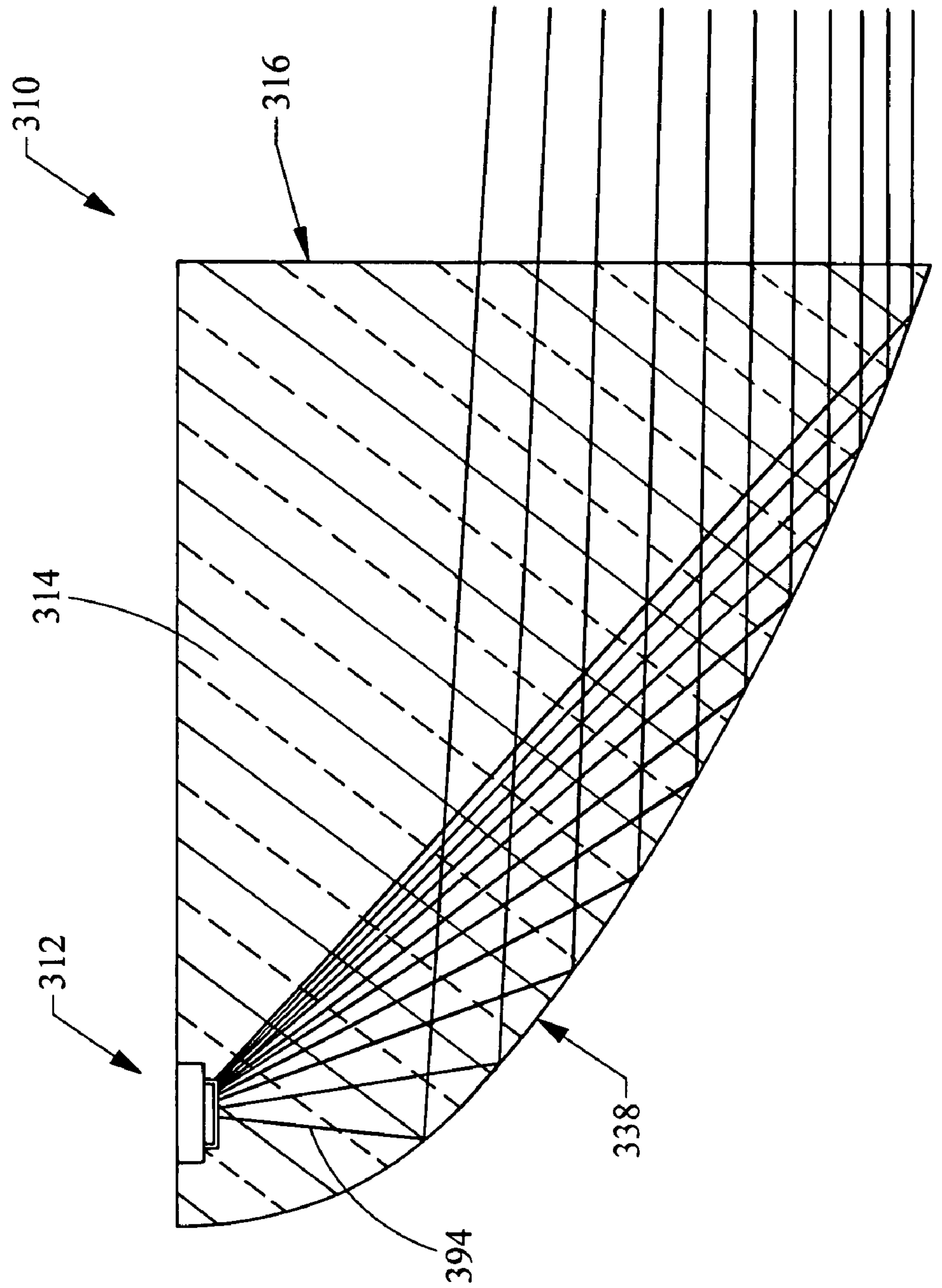
FIG. 8 is a cross-sectional view similar to FIG. 3 of yet another alternative embodiment of a trough-type headlamp module having a light source with a limited spread and embodying the principles of the present invention.

FIG. 8 shows yet another alternative trough-type headlamp module 310, where the LED 312 itself is directional and has a limited spread to minimize the refraction rays that escape through the bottom surface 338 of the trough 314. For example, the LED 312 is positioned such that its rearward-most directed light rays 394 strike the bottom surface 338 at an angle of incidence sufficiently large to reflect the light rays towards the exit surface 316. Therefore, all, or substantially all, of the light rays emitted from the LED 312 are at least substantially reflected towards the exit surface 316.

Figure 9:
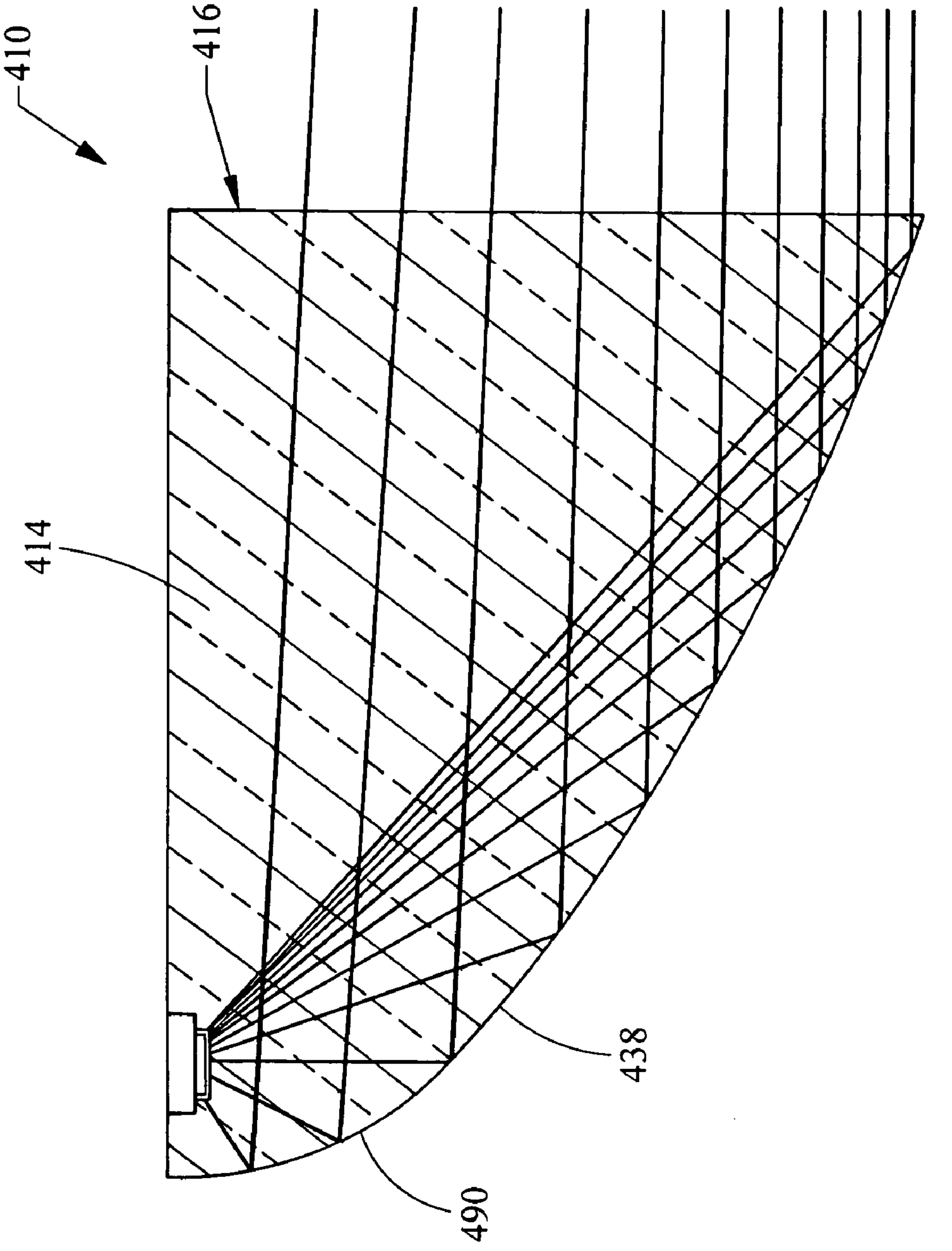
FIG. 9 is a cross-sectional view similar to FIG. 3 of another alternative embodiment of a trough-type headlamp module having a reflective coating on a portion of the translucent member and embodying the principles of the present invention.

FIG. 9 shows another alternative trough-type headlamp module 410, where the translucent member 414 includes a reflective coating 490 covering at least a portion of the bottom surface 438. The reflective coating 490 is a highly-reflective material, such as metal, so that the rearward-most directed light rays 494 are reflected towards the exit surface 416 rather than being lost through the bottom surface 438, as is seen in FIG. 3.

Although the projector-type headlamp modules 5, the high beam module 6, the turn signal modules 7*a*, 7*b*, and the park light modules 8 shown in FIG. 1 are each generally known in the prior art, in an alternative design the headlamp assembly 2 may utilize a plurality of trough-type light modules embodying the principles of the present invention in lieu of these modules 5, 6, 7*a*, 7*b*, 8.

It is therefore intended that the foregoing detailed description be regarded as illustrative rather than limiting, and that it be understood that it is the following claims, including all equivalents, that are intended to define the spirit and scope of this invention.

What is claimed is:

1. A headlamp module for a motor vehicle comprising:
a light source configured to emit light rays; and
a translucent member having portions defining: a support portion configured to support the light source so that the light rays are able to enter the translucent member, a reflection surface configured to internally reflect the light rays in a forward direction, and an exit surface configured to permit the light rays to pass therethrough so as to be emitted from the translucent member in the forward direction generally parallel to a light ray axis; and
the exit surface defining a periphery and the support portion is positioned with respect to the exit surface such that a projection of the support portion along a line parallel to the light ray axis is located adjacent to the periphery of the exit surface whereby the light source is discretely positioned with respect to the exit surface.

2. A headlamp module as in claim 1, wherein the translucent member includes a top surface and a bottom surface each intersecting the exit surface, the support portion being defined by the top surface.

3. A headlamp module as in claim 2, wherein the top surface is generally perpendicular to the exit surface.

4. A headlamp module as in claim 2, wherein a portion of the bottom surface is generally arcuate in shape.

5. A headlamp module as in claim 4, wherein at least a portion of the bottom surface is parabolic in shape.

6. A headlamp module as in claim 2, wherein the light source is positioned adjacent to a focus of the bottom surface and the top surface.

7. A headlamp module as in claim 2, the translucent member further including a first side surface and a second side surface intersecting the top surface, the bottom surface, and the exit surface, each of the first and second side surfaces including a tapered portion extending in a direction not parallel to the light ray axis.

8. A headlamp module as in claim 7, wherein the tapered portion of each of the first and second side surfaces is generally linear.

9. A headlamp module as in claim 7, wherein the tapered portion of each of the first and second side surfaces is generally arcuate.

10. A headlamp module as in claim 1, wherein the light source is configured to emit light rays through an outer surface thereof and the support portion engages at least a portion of the outer surface of the light source so that at least a portion of the light rays emitted through the outer surface of the light source are able to immediately enter the translucent member.

11. A headlamp module as in claim 1, wherein the translucent member includes a reflective coating defining at least a portion of one of the reflection surfaces.

12. A headlamp module as in claim 1, further comprising a second light source supported by a second support portion defined in the translucent member.

13. A headlamp module for a motor vehicle comprising:

at least one light source configured to emit light rays and including an outer surface through which the light rays are emitted; and a translucent member having portions defining:

a support portion engaging at least a portion of the outer surface of the light source so that at least a portion of the light rays emitted through the outer surface of the light source enter the translucent member through the support portion;

a reflection surface configured to internally reflect the light rays in a forward direction, and an exit surface configured to permit the light rays to pass therethrough so as to be emitted from the translucent member in the forward direction and generally parallel with each other.

14. A headlamp module as in claim 13, wherein the light source is a light emitting diode having a light emitting chip and a protective coating at least partially disposed around the light emitting chip so as to define at least a portion of the outer surface of the light source.

15. A headlamp module as in claim 14, wherein the support portion completely engages an outer surface of the protective coating.

16. A headlamp module as in claim 14, wherein the support portion engages the light emitting diode in a form-fitting engagement.

17. A headlamp module as in claim 16, the translucent member further including a top surface, a bottom surface, a first side surface and a second side surface each intersecting the top surface, the bottom surface, and the exit surface, wherein each of the first and second side surfaces includes a tapered portion extending in a direction not parallel to the light ray axis.

18. A headlamp module as in claim 17, wherein the bottom surface is parabolic in shape and the light source is positioned adjacent to a focus of the bottom surface.

19. A headlamp assembly for a motor vehicle comprising:

a plurality of headlamp modules cooperating to provide illumination for the motor vehicle, wherein at least one of the plurality of headlamp modules includes:

a light source configured to emit light rays; and a translucent member having portions defining: a support portion configured to support the light source so that the light rays are able to enter the translucent member, a reflection surface configured to internally reflect the light rays in a forward direction, and an exit surface configured to permit the light rays to pass therethrough so as to be emitted from the translucent member in the forward direction generally parallel to a light ray axis; and the exit surface defining a periphery and the support portion is positioned with respect to the exit surface such that a projection of the support portion along a line parallel to the light ray axis is located adjacent to the periphery of the exit surface whereby the light source is discretely positioned with respect to the exit surface.

20. A headlamp assembly as in claim 19, wherein the translucent member includes a top surface and a bottom surface each intersecting the exit surface, the support portion being defined by the top surface.

21. A headlamp assembly in claim 20, wherein the light source is positioned adjacent to a focus of the bottom surface and the top surface.

22. A headlamp assembly a in claim 19, wherein the at least one of the plurality of headlamp modules is a trough module cooperating with at least one other trough module to define a set of trough modules.

23. A headlamp assembly as in aim 22, wherein the plurality of headlamp modules further includes a set of projector modules cooperating with the set of trough modules to generates a low beam.

24. A headlamp assembly as in claim 23, wherein the plurality of headlamp modules further includes a high beam module configured to generates a high beam and a turn signal module configured to generates a light signal beam.

* * * * *

UNITED STATES PATENT AND TRADEMARK OFFICE

CERTIFICATE OF CORRECTION

PATENT NO. : 7,513,665 B2
APPLICATION NO. : 11/435249
DATED : April 7, 2009
INVENTOR(S) : Jeyachandrabose Chinniah et al.

It is certified that error appears in the above-identified patent and that said Letters Patent is hereby corrected as shown below:

In column 10, claim 21, line 29, after "headlamp assembly" insert --as--.

In column 10, claim 22, line 32, after "headlamp assembly" replace "a in" with --as in--.

In column 10, claim 23, line 36, after "headlamp assembly as in" replace "aim 22" with --claim 22--.

In column 10, claim 23, lines 38-39, after "through modules to" replace "generates" with --generate--.

In column 10, claim 24, line 42, before "a high beam" replace "generates" with --generate--.

In column 10, claim 24, line 43, before "a light signal beam" replace "generates" with --generate--.

Signed and Sealed this

Twenty-sixth Day of October, 2010

David J. Kappos

*Director of the United States Patent and Trademark Office*